(12) United States Patent
Seppa et al.

(10) Patent No.: US 7,675,035 B2
(45) Date of Patent: Mar. 9, 2010

(54) COUPLING AND METHOD FOR A TRANSITION-EDGE BOLOMETER

(75) Inventors: Heikki Seppa, Helsinki (FI); Panu Helistö, Espoo (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 0 days.

(21) Appl. No.: 11/920,236

(22) PCT Filed: May 10, 2006

(86) PCT No.: PCT/FI2006/000152

§ 371 (c)(1),
(2), (4) Date: Feb. 8, 2008

(87) PCT Pub. No.: WO2006/120290

PCT Pub. Date: Nov. 16, 2006

(65) Prior Publication Data
US 2009/0014655 A1    Jan. 15, 2009

(30) Foreign Application Priority Data
May 13, 2005    (FI) ................................. 20050515

(51) Int. Cl.
*G01J 5/00* (2006.01)
(52) U.S. Cl. .................................................. 250/338.1
(58) Field of Classification Search ............... 250/336.2, 250/338.1
See application file for complete search history.

(56) References Cited

U.S. PATENT DOCUMENTS

| | | | |
|---|---|---|---|
| 6,211,519 B1 | 4/2001 | Nam et al. | |
| 6,455,849 B1 | 9/2002 | Hilton et al. | |
| 6,576,904 B1 | 6/2003 | Volkening | |
| 7,078,695 B2 * | 7/2006 | Luukanen | 250/336.2 |
| 2002/0171040 A1 | 11/2002 | Goldie et al. | |
| 2003/0222217 A1 * | 12/2003 | Luukanen | 250/336.2 |

OTHER PUBLICATIONS

Neff et al., Appl. Phys. Lett., vol. 66, No. 18, May 1, 1995, pp. 2421-2423.
Roth et al., Nuclear Instruments and Methods in Physics Research A, vol. 443, 2000, pp. 351-363.
Irwin et al., Nuclear Instruments and Methods in Physics Research A, vol. 520, 2004, pp. 544-547.
Ivanov et al., Physica C, 372-376, 2002, pp. 432-435.
Lakew et al., Sensors and Actuators A, vol. 114, 2004, pp. 36-40.
"Yvon et al.," Low noise cryogenic electronics: Preamplifier configurations with feedback on the bolometer, IEEE Transactions on nuclear science, vol. 47, No. 2, 2000, pp. 428-437.

* cited by examiner

*Primary Examiner*—David P Porta
*Assistant Examiner*—Mark R Gaworecki
(74) *Attorney, Agent, or Firm*—Birch, Stewart, Kolasch & Birch, LLP

(57) ABSTRACT

The invention relates to a circuit for transition-edge bolometers, which comprises a resistor element (1) arranged to operate in the transition-edge zone, and an amplifier (5) connected to the resistor element (1). According to the invention, in connection with the amplifier (5) means are arranged for implementing positive (4, 5) and negative (5, 2) feedbacks in the resistance measurement.

12 Claims, 3 Drawing Sheets

COUPLING AND METHOD FOR A TRANSITION-EDGE BOLOMETER

The present invention relates to a circuit, according to the preamble of Claim 1, for transition-edge bolometers.

The invention also relates to a method for transition-edge bolometers.

If the temperature of a superconducting thermally insulated object is very close to the transition point, its resistance will change very greatly due to even a small amount of additional energy caused, for example, by radiation or a mass particle. Transition-edge bolometers are used, for example, to detect millimetre waves. In them, the power is often directed through an antenna integrated in the bolometer.

A solution according to the prior art is described in the following.

Usually, the resistance value of a bolometer is relatively small, from hundreds of milliohms to a few ohms, and it is cooled to temperatures of 100 mK-10 K, depending on the application. In principle, the noise of a bolometer is restricted to so-called phonon noise, but in practice the noise of the electronics can be considerably greater than that.

Because the change in the resistance as a function of temperature is very great, the current following through it heats the components and gives rise to thermal feedback. If a constant current is run over the resistance, the thermal feedback will be positive: the current heats the resistance, in which case the resistance increases and the increased resistance draws more power from the power supply and the system becomes unstable. The device will begin to vibrate or drift to the side.

For this reason, in the prior art the transition bolometer is voltage-biased, so that the thermal feedback will be negative. In voltage bias the heating of the resistance increases the value of the resistance and the resistance draws less power from the constant-voltage supply and the final change in the resistance value is smaller, due to the negative feedback. Positive feedback increases the dynamic impedance of the resistance, but negative feedback reduces it. Low-noise amplifiers, particularly at room temperature, favour a high impedance, especially at low signal frequencies. If a transformer is used to increase the impedance, the electronics would become more complex. Because negative feedback will further reduce the output impedance of the bolometer, it is nearly impossible to measure it using room-temperature electronics, without increasing noise. Positive feedback is difficult to exploit, because the system becomes unstable.

Traditionally, a SQUID has been used as a pre-amplifier in transition bolometers, because a low-noise SQUID amplifier favours a very low impedance in the subject. A SQUID is, however extremely sensitive sensor and safety solutions in schools. In apparatus using mechanical cooling (a compressor), a SQUID is not the best solution, as mechanical cooling will cause vibration, to which the SQUID is sensitive.

The present invention is intended to eliminate the defects of the prior art and create an entirely new type of circuit and method for transition-edge bolometers.

The invention is based on using both positive and negative feedback simultaneously. In practice, this can be implemented by using current biasing implemented using positive feedback combined with negative voltage feedback. One embodiment of the invention seeks to maximize the value of the dynamic resistance (of the bolometer).

More specifically, the circuit according to the invention is characterized by what is stated in the characterizing portion of Claim 1.

The method according to the invention is, in turn, characterized by what is stated in the characterizing portion of Claim 7.

Considerable advantages are gained with the aid of the invention.

With the aid of preferred embodiments of the invention the dynamic value of the bolometer resistance is maximized, but the system is nevertheless kept stable. With the aid of embodiments of the invention, advantages are gained in, among other things, multipoint imaging equipment.

In the following, the invention will be examined with the aid of examples of embodiments according to the accompanying drawings.

Figure 1:
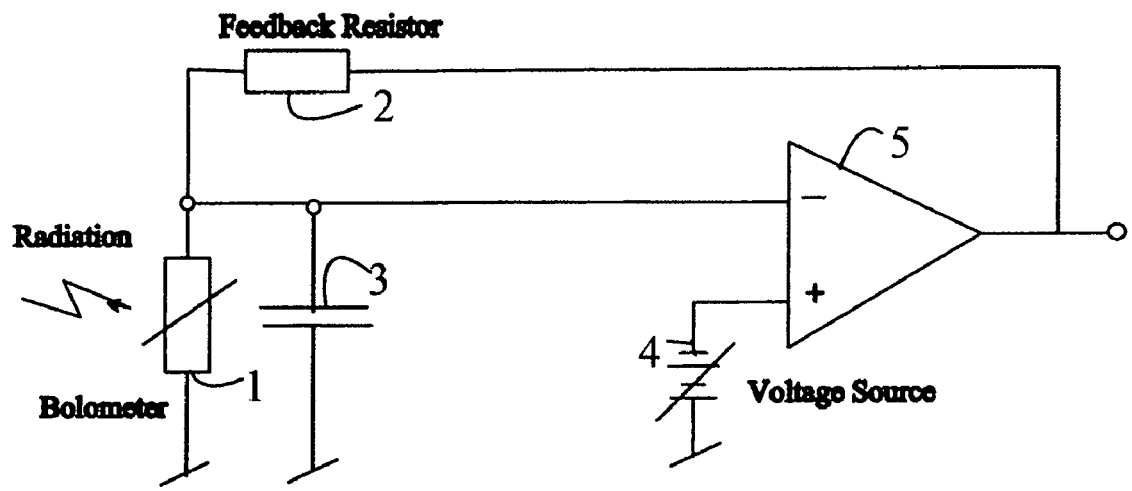
FIG. 1 shows one circuit according to the invention.

If electrical power is brought, for example, to the resistance 1 of FIG. 1, the power will alter the value of the resistance and the power that the resistance draws from a current or voltage source. If the feedback is positive, the dynamic value of the resistance will increase. Negative feedback, on the other hand, will reduce the value of the resistance.

If the value of the resistance increases as a result of heating, and if we current-bias the resistance, the thermal feedback will be positive. Correspondingly, in this situation the voltage bias causes a negative thermal feedback. If the resistance diminishes as the temperature rises the situation is the opposite. In the present invention a method is disclosed in which we create both a positive feedback to increase impedance and a negative feedback to make the system stable.

FIG. 1 shows electronics, in which the bolometer 1 is current-biased. The current biasing is implemented by connected the operation amplifier 5 to be a voltage follower, by connecting the voltage source 4 to the positive input of the operation amplifier and back coupling the output on the operation amplifier 5 by a resistor 2 to the negative input of the operation amplifier and, at the same time, to the measuring resistor 1. The negative terminal of the voltage source 4 is connected to the positive input of the operation amplifier 5 and correspondingly the positive terminal of the voltage source 4 to the earth potential. We will assume that we are using, for example, a bolometer 1 based on super transition, in which the value of the bolometer resistor 1 increases very rapidly when the temperature rises. In the example of the figure, a capacitor 3 is installed over the resistor 1, to ensure that the bolometer 1 will always remain voltage biased at high frequencies. This ensures that the bolometer will be stable at high frequencies. At very high frequencies, the thermal feedback will not operate due to the specific heat of the bolometer and the system will always be stable in this frequency range. At low frequencies, the operation amplifier sees the value of the resistor as being very high, because the positive thermal feedback, implemented with the aid of the positive terminal of the operation amplifier 5 connected to the voltage source 4, increases the dynamic impedance of the resistor 1. This is advantageous, because the optimal impedance of a typical amplifier 5 is great in terms of the noise temperature of the amplifier 5, and is generally considerably greater than the resistance value of the bolometer. The amplifier 5 amplifies the voltage change over the bolometer and the current feedback is made in such a way that the system is stable in its entirety. In other words, the positive thermal feedback increases the dynamic value of the resistor 1, but, with the aid of the feedback field of the feedback resistor 2 made through the amplifier 5, an electrically negative feedback is created and, at the same time, a thermal negative feedback. The value of the feedback resistor is typically in the order of kilo-ohms. If the response time of the operation amplifier is sufficiently short, the capacitor 3 will not necessarily be required. The currents travelling through the bolometer are in the order of magnitude of milliamperes while the voltage bias 3 is in the order of millivolts.

The dimensioning of the circuit is influenced by thermal time constants, which are typically in the order of magnitude of microseconds to milliseconds.

As a final result, the system behaves in exactly the same way as if we had originally voltage-biased the resistor and created a negative thermal feedback.

Figure 2:
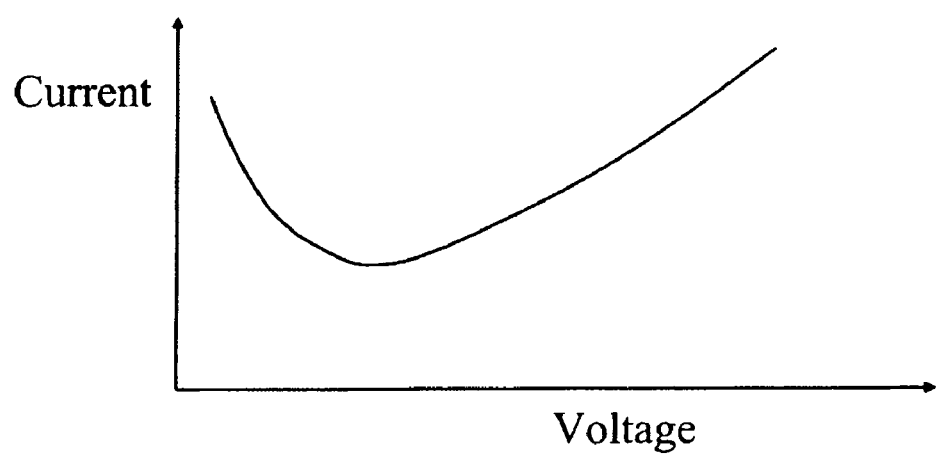
FIG. 2 shows graphically the voltage dependence of a resistance 1.

FIG. 2 shows the value of the current as a function of the voltage operating point. At the turning point (a the current minimum) the amplifier 5 sees an infinite dynamic impedance, so that only the current noise of the amplifier 5 causes an increase in effective noise. The circuit is advantageous not only because the effect of the noise of the amplifier can be minimized, but also because the effect of the thermal noise of the conductor between the bolometer 1 and the amplifier 5 on the noise of the entire system is practically cancelled.

The operation of a device exploiting the invention can also be explained as follows: consider first that the output of the amplifier 5 is at a constant voltage. Now the bolometer is current-biased through the feedback resistor 2, and behaves like a positive feedback. This means that the amplifier 5 sees the bolometer 1 as being high-impedance. However, the amplifier 5 corrects the output voltage in such a way that the mean voltage of the bolometer 1 is the same as the reference voltage 4 and thus the entire system is negatively back-coupled and the entire system, including the bolometer 1, behaves in a stable manner. The current-voltage behaviour of the system is shown in FIG. 2. If we place the operating point very close to the minimum point of FIG. 2, the dynamic impedance of the bolometer 1 is nearly infinite and at this point the voltage noise of the pre-amplifier 5 is of no significance to the total noise. This of course leads to it being worthwhile to select the amplifier 5 in such a way that it has a low current noise, because the system permits a reasonably large voltage noise.

The method disclosed in the invention can be used in connection with bolometers of various kinds. The only requirement is that the temperature coefficient must be sufficient for the electrical biasing to create a thermal feedback. The method is also very practical, because we can use very cheap amplifiers operating at room temperature to amplify the weak signal. Because the resistance between the bolometer 1 and the amplifier 5 can be large, we will be able in multi-channel types of camera, for example, in millimetre or infrared receivers, to minimize the thermal loss taking place through the conductors.

It is well known that bolometers, which change a change in temperature to a change in resistance value, can be used to detect millimetre radiation. At the present moment, the aim is to manufacture cameras, which consist of n×k antenna-connected elements. If an amplifier is placed after each element, the system will become very complex. Attempts have been made to solve the problem with frequency or time-level multiplexing. Another approach is to use a single detector or line-detector and to mechanically move the lenses and mirrors, in order to form an image. This approach will very easily lead to an expensive solution.

One embodiment of the present invention discloses a simple method for manufacturing a millimetre camera, in which a single line is read at a time and the change from one line to the next takes place electrically. The result of the method is that only k amplifiers are needed to read k×n camera pixels. Naturally, the method can be used also for light and X-ray detectors. In this system, it is assumed that the resistance of the bolometer changes so intensely that so-called positive or negative thermal feedback occurs. This condition is only valid in detectors based on superconducting transition.

Figure 3:
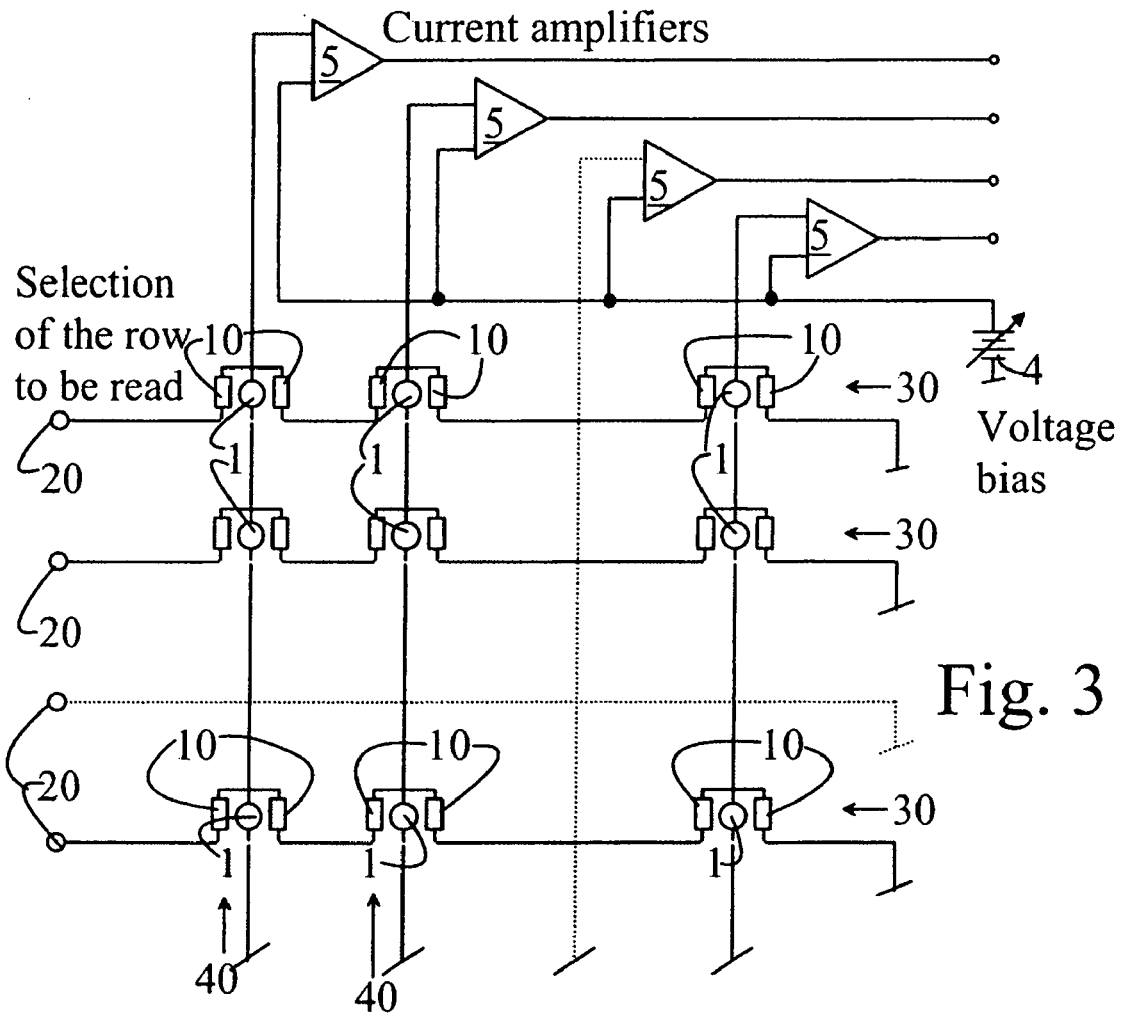
FIG. 3 shows a second circuit according to the invention, for controlling a bolometer matrix.
Figure 4:
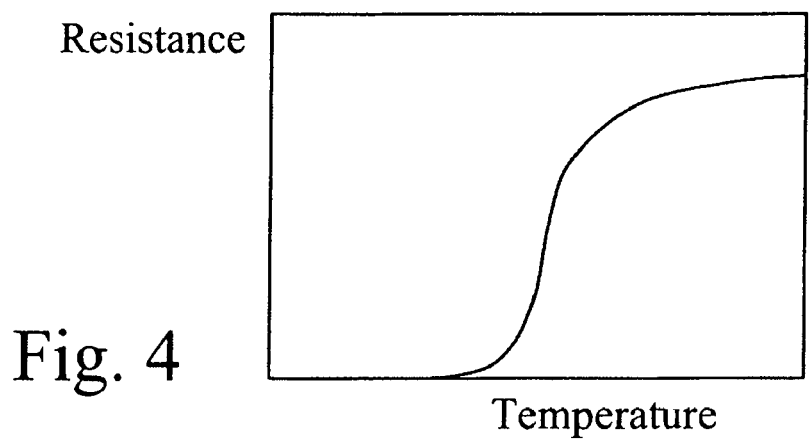
FIG. 4 shows graphically the temperature dependence of a bolometer resistance.

FIG. 3 shows a camera with k×n pixels. The circles depict bolometer elements and the rectangles 10 the resistors or coils placed in their immediate vicinity, which increase the temperature of the bolometers or create a magnetic field. FIG. 4 shows the dependence on temperature of a typical super-transition bolometer, if we assume that the measuring current is very small. In other words, the graph does not take account of thermal feedback, which changes greatly the behaviour of the bolometer resistor 1. If we consider that the temperature of the resistor element 1 is slightly below super transition, the resistor element 1 will be infinitely electrically conductive and the current in the voltage bias will increase to be, in principle, infinitely large. However, due to the magnetic field, transition takes place and the power increases the temperature of the element, in such a way that, at a suitable voltage bias, the system settles in the transition zone. If there are several resistor elements 1 in series, the situation is more complicated. Let us assume that one element is warmer than the others, or that it is influenced by an additional magnetic field. When voltage is set from the terminals 20 over the entire row 30, the current will increase until the transition caused by the magnetic field takes place, naturally first of all in the hottest element or in the element with the greatest magnetic field. When that element becomes resistive, the current stabilizes and the other elements will remain superconducting. In other words, we can use either an extra magnetic field or heating to selecting the horizontal row 30, in which the bolometers will drift to the transition zone, driven by the voltage bias. Because the other elements remain superconducting, they do not increase the noise in the measurement. In the circuit of FIG. 3, it is naturally possible to apply the idea of positive and negative feedback according to FIG. 1.

Figure 5:
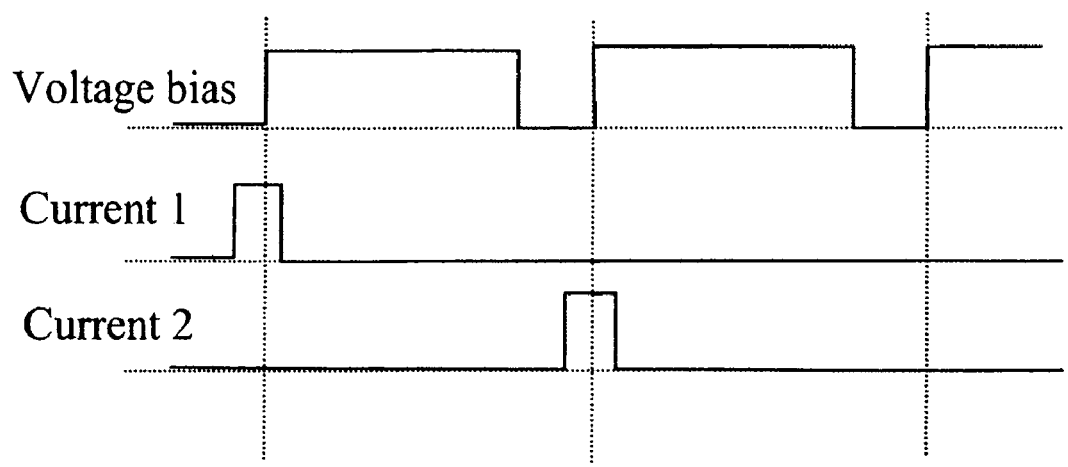
FIG. 5 shows a timing diagram of the circuit according to FIG. 3.

FIG. 5 shows the voltage bias and an example of the control of the two first vertical rows 40, as a function of time. First of all the current of the current amplifiers formed by the operational amplifiers 5 and the voltage source 4 is used to select the vertical row 40 that is it wished to activate. Next the voltage bias of the horizontal row 30 is switched on. Immediately after this, the total resistance of the vertical row 40 is read. If heating is used instead of a magnetic field to select the row, a small error, which is due to the power produced by the heating, will appear in the measurement result. However, this power and the corresponding error is always the same and the heat diffuses rapidly, if the specific heat of the heater is kept sufficiently low. Because the time constant of the bolometers is very short (1 µs-100 µs), we can make the row selection very quickly. The secondary frequency of the camera is best to be in the order of 10 Hz-50 Hz, so that, depending on the number of horizontal rows, we will have time of about 100 µs-10 ms to measure one row. In other words, in practice we have a row setting time that is clearly short that the measuring time, so that we can use nearly the whole time to perform the measurement. This is made possible by the fact that the row selection as such does not weaker the camera's signal-noise ration. Of course, the method described is weaker by the ratio S/N than if we were to read all of the pixels all of the time.

Figure 6:
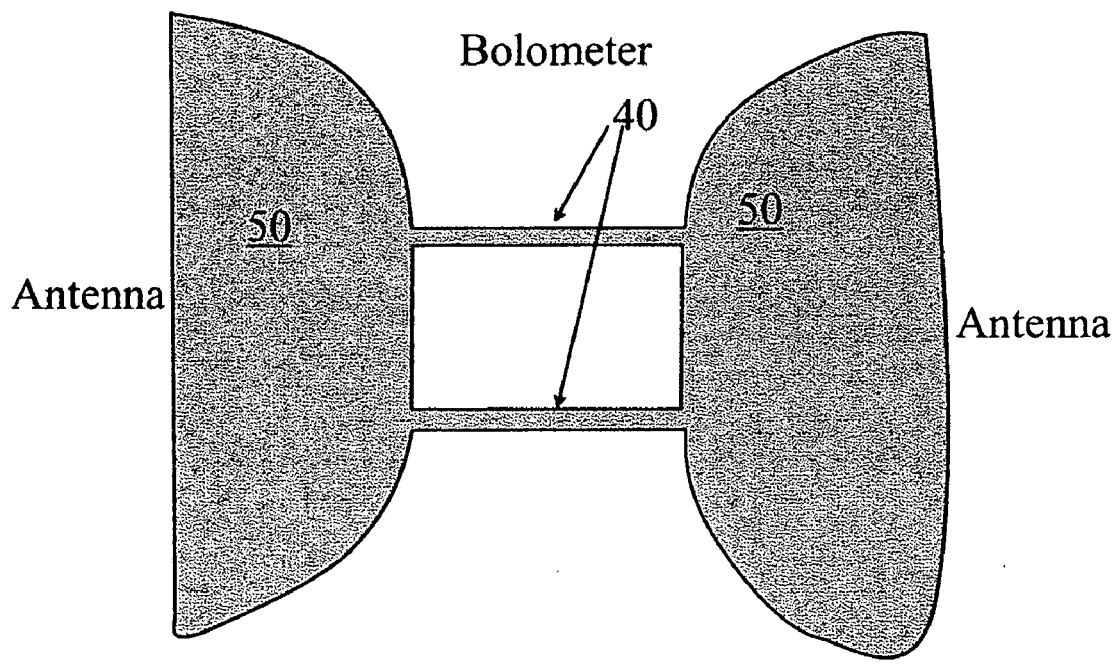
FIG. 6 shows schematically one bolometer suitable for the invention.

The selection of the row achieved with the aid of a magnetic field is an attractive alternative, because when carried out in this way the bolometer need not be heated. However, if the bolometer element is thin, a large magnetic field will be required for the selection of the row to be unequivocal. FIG. 6 presents a solution, in which the bolometer element between the antennae 50 is divided into two parts 40, in such a way that the distance between them is about 50 µm-300 µm. When the bolometer is in a superconducting state, and if a magnetic field is directed on it, a current will arise in the loop formed by the bolometer. If an external current is switched on, one or other of the two bolometer elements 40, depending on the direction of the current, will become resistive. When this happens, the current created by the biasing will be forced to travel through only the other conductor and it too will enter a resistive state. The magnetic field can be created by placing, for example, beneath the bolometer and the substrate, a small current loop of preferably superconducting material, with 1-10 rounds, which will induce the necessary magnetic field in the bolometer loop. Even though the bolometer consists of two parts, it acts as one element. Only the impedance experienced by the microwave and the reading electronics will be smaller by a half. This can, however, be easily changed by altering either the length or width of whole bolometer element.

It should be noted, that other transition-type bolometers too can be utilized in the present invention.

The invention is preferably suitable for measuring radiation that has a frequency range of 10 Ghz-10 THz.

The invention claimed is:

1. Circuit for transition-edge bolometers, which comprises a resistor element included in a transition-edge bolometer, wherein the resistor element is arranged to operate in the transition-edge zone, and
an amplifier connected to the resistor element,
wherein positive and negative feedbacks, using the amplifier, are implemented in the measurement of an impedance associated with the resistor element.

2. Circuit according to claim 1, wherein the positive feedback is created with the aid of a current bias and the negative feedback with the aid of a voltage feedback.

3. Circuit according to claim 1 or 2, wherein a capacitor is connected in parallel with the resistor element, in order to stabilize the circuit at high frequencies.

4. Circuit according to claim 1 or 2, wherein a k×n matrix is formed from resistor elements and each resistor element is raised to the transition zone row by row, in which case an individual resistor element of each row can be raised to the transition zone and thus the matrix's k×n resistor elements can be read with a minimum number of amplifiers.

5. Circuit according to claim 4, further including either k or n number of amplifiers.

6. Circuit according to claim 1 or 2, wherein the bolometer is divided into two parts.

7. Method for transition-edge bolometers, said method comprising:
arranging a resistor element, included in a transition-edge bolometer, to operate in the transition-edge zone, and
measuring the resistance value of the resistor element using an amplifier connected to it,
wherein
both positive and negative feedbacks are implemented using the amplifier, during the measurement of an impedance associated with the resistor element.

8. Method according to claim 7, wherein the positive feedback is created with the aid of a current bias and the negative feedback with the aid of a voltage feedback.

9. Method according to claim 7 or 8, further comprising connecting a capacitor in parallel with the resistor element, in order to stabilize the circuit at high frequencies.

10. Method according to claim 7 or 8, further comprising forming a k×n matrix from resistor elements, wherein each resistor element is raised to the transition zone row by row, in which case an individual resistor element of each row can be raised to the transition zone and thus the matrix's k×n resistor elements can be read with a minimum number of amplifiers.

11. Method according to claim 10, further including either k or n number of amplifiers.

12. Method according to claim 7 or 8, wherein the bolometer is divided into two parts.

* * * * *